United States Patent [19]

DeBoer

[11] 4,136,731
[45] Jan. 30, 1979

[54] HEAT TRANSFER APPARATUS

[76] Inventor: Richard J. DeBoer, 4054 Baumhoff, NW., Comstock Park, Mich. 49321

[21] Appl. No.: 827,900

[22] Filed: Aug. 26, 1977

[51] Int. Cl.² .......................................... F27D 17/00
[52] U.S. Cl. ................................ 165/12; 122/20 B; 126/101; 165/48 R; 237/8 R; 237/19; 237/55
[58] Field of Search ..................... 237/8 R, 19, 55; 126/101, 117; 165/DIG. 12, 48, 12; 122/20 B

[56]  References Cited
U.S. PATENT DOCUMENTS

| 1,990,056 | 2/1935 | Van Daam | 122/20 |
|---|---|---|---|
| 2,029,574 | 2/1936 | Knudsen | 237/19 X |
| 2,199,183 | 4/1940 | Lippincott et al. | 237/19 |
| 2,481,480 | 9/1949 | Main | 122/20 B X |
| 2,521,462 | 9/1950 | Kinzelmann | 122/20 B X |
| 3,896,992 | 7/1975 | Borovina et al. | 237/19 |
| 3,999,709 | 12/1976 | Estabrook | 237/8 R |
| 4,083,398 | 4/1978 | Fallon et al. | 165/DIG. 12 X |

FOREIGN PATENT DOCUMENTS

| 23678 | 2/1964 | Japan | 165/DIG. 12 |

Primary Examiner—Charles J. Myhre
Assistant Examiner—Margaret LaTulip
Attorney, Agent, or Firm—Price, Heneveld, Huizenga & Cooper

[57]  ABSTRACT

A heat transfer system for use in supplementing the operation of the heating/cooling system of a building and its hot water heating system includes a heat exchanger in the flue of the furnace as well as a heat exchanger in the fan chamber. A first liquid circulation loop couples the heat exchangers for transferring heat from the flue exchanger to the air moved through the fan chamber heat exchanger. A second liquid circulation loop includes the flue exchanger and the building hot water heater for supplementing the heating of water therein. In the summer months during the cooling mode of the systems operation, cold water employed, for example, for lawn sprinkling is passed through the fan chamber heat exchanger for cooling and dehumidifying air circulated in the building. A valve control system is employed to automatically control the flow path of fluid in the system as a function of detected temperatures.

11 Claims, 2 Drawing Figures

HEAT TRANSFER APPARATUS

BACKGROUND OF THE INVENTION

The present invention relates to heat transfer apparatus and more particularly to a supplemental heating and cooling system for a forced air furnace and for supplementing the heating of water in a building.

It is well recognized that home heating systems are quite inefficient in their operation. Recent studies have indicated that a significant percentage of the heat of home furnaces is lost through the escape of hot flue gasses up the chimney. In order to capture some of the lost heat, several prior art systems have been proposed by which heat exchangers have been positioned in the chimney flue and liquid circulated through the heat exchanger and either returned to the hot water tank of the home for supplementing its heating of hot water and/or used in a hot water radiator for providing supplemental heat. U.S. Pat. No. 3,896,992 issued on July 29, 1975, to Borovina et al and U.S. Pat. No. 3,999,709 issued Dec. 28, 1976, to Estabrook are representative of this prior art.

The prior art systems although useful in capturing some of the lost heat of a furnace have been employed primarily in hot water heating system as opposed to forced air heating systems and have represented relatively complex systems which greatly increase the cost of installation and maintenance.

SUMMARY OF THE INVENTION

The present invention provides a heat transfer apparatus in which a heat exchanger is provided for positioning in the chimney flue of a furnace and a second heat exchanger is positioned in the blower chamber of the furnace. A first circulating loop for a heat transferring liquid is provided between the heat exchangers such that liquid heated in the flue exchanger is returned to the fan chamber exchanger for supplementing the furnace heating during furnace operation. A second loop including the flue exchanger and a water heater employed in the building is provided with a temperature and timer actuated pump for removing the volume of hot water from the flue exchanger into the water heater of the building. The timer employed assures that the pump operates for a period sufficient for the preheated water from the flue exchanger to be supplied to the water heater. In addition to the first and second loops which include control valve means for their operation, during the summer months the building's cold water is supplied through the fan chamber heat exchanger to dehumidify and cool the forced air in the system.

By providing combined water heating and supplemental heat to the furnace, the heat normally lost through the chimney flue is captured and effectively employed to supplement the building heating system and/or hot water supply. By using the fan chamber heat exchanger during the summer months, the system's air conditioning is supplemented by cold water drawn through the system.

DETAILED DESCRIPTION OF THE PREFERRED EMBODIMENT

Figure 1:
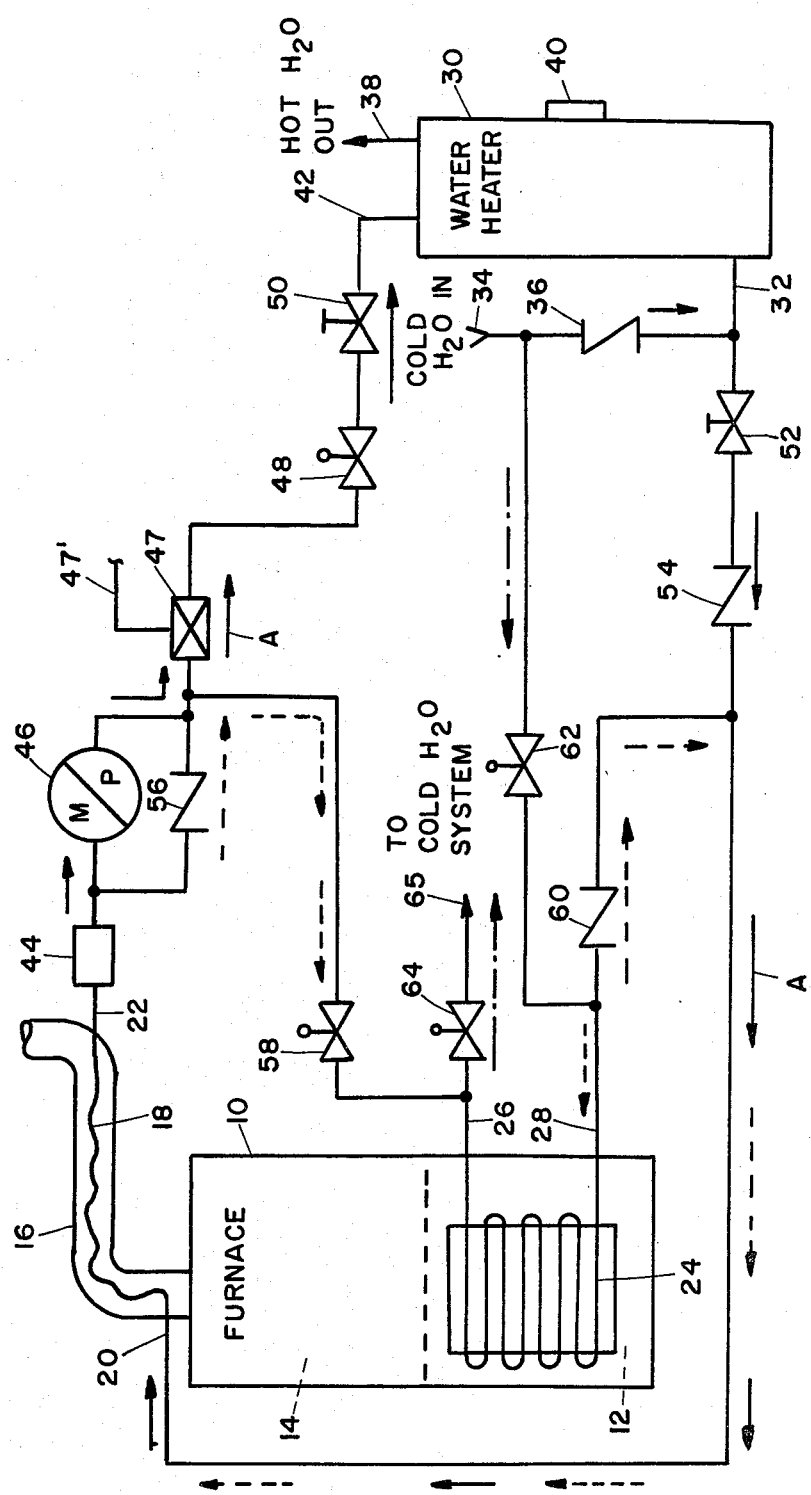
FIG. 1 is a schematic diagram of the preferred embodiment of the system embodying the present invention.

Referring initially to FIG. 1 there shown a furnace 10 of conventional design and which includes a return air plenum 12 having therein a conventional blower or fan for the circulation of air through the ductwork of a building. The upper portion of the furnace 10 includes a conventional heat exchanger and a chimney flue 16 for exhausting the gasses of combustion. Positioned in the chimney flue 16 is a first or flue heat exchanger 18 which can, for example, comprise a coil of stainless steel or copper tubing positioned concentrically around the interior or exterior surface, respectively, of the flue 16. Exchanger 18 includes a fluid inlet 20 and a fluid outlet 22.

Also mounted to the otherwise conventional furnace 10 is a second heat exchanger 24 positioned preferably in the flow path of air in the plenum 12 for the transfer of heat between the surrounding air and the heat exchanger 24. Exchanger 24 can comprise a conventional heat exchanging radiator also including comprising a plurality of turns of tubing and surrounding turns of tubing and surrounding fins. Exchanger 24 includes a fluid inlet 26 and a fluid outlet 28. The system also includes a conventional water heater 30 having a cold water inlet 32 coupled to a source of cold water from an inlet 34 through a check valve 36. Water heater 30 also conventionally includes a hot water outlet 38 and an associated thermostat control 40 for selectively activating the heater as the water temperature in the tank of heater 30 drops to a predetermined level. Heater 30 includes an additional inlet 42 which as explained more fully hereinafter, supplies preheated water to the upper end of the tank according to one aspect of the present invention.

Heat exchanger 18 is coupled in a first circulatory loop including the water heater 30 by a flow path including a temperature actuated switch 44 which senses the water temperature therein and opens when the temperature exceeds a predetermined level which can be preset. In the preferred embodiment valve 44 is normally closed and opens when the water temperature from heat exchanger 18 reaches about 150° F. The first circulatory loop for heat exchanger 18 also includes a pump 46 having its inlet coupled to valve 44 and having its outlet coupled to a normally open solenoid valve 48 through a pressure relief popout valve 47. Valve 47 is normally open and includes an exhaust bleeder passage 47' in the event the pressure of the system exceeds a predetermined level. A manually operated valve 50 couples the output of valve 48 to the hot water inlet 42 of water heater 30. The first circulatory loop also includes a manually operated valve 52 which receives water from tank 30 or the cold water supply 34 and passes it through a check valve 54 to the inlet 20 of exchanger 18. The flow of water in the first circulatory loop is shown by the solid arrows A adjoining the diagram shown in FIG. 1.

Heat exchanger 18 is also included in a second circulatory loop which includes temperature actuated switch 44, check valve 56 and solenoid operated valve 58. Valve 56 is in parallel with motor 46 and permits the flow of water from left to right in FIG. 1 to bypass pump 46 and to enter heat exchanger 24 at inlet 26 thereof through valve 58. Water then exits exchanger 24 through outlet 28 passing through a second check valve 60 and returns to the inlet 20 of exchanger 18 as shown by the dotted arrows B in the figure. Check valve 54 prevents water flowing in this loop from entering the water heater 30. Thus the flue heat exchanger 18 is included in a first loop which includes a water heater 30 and a second loop which includes the lower heat exchanger 24 both of which are employed for supplementing the energy supplied to either heat water in the first instance for the building or to supplement furnace heating during its operation in the second instance.

Heat exchanger 24 is also employed for cooling and dehumidifying during the summer months and for such purpose as solenoid actuated valve 62 is provided and is coupled to the cold water inlet 34 and to outlet 28 of the heat exchanger 24. Cold water then passes from outlet 26 to the cold water system of the building through a second solenoid valve 64. During the cooling mode of operation as more fully described below, valve 58 is closed thus preventing cold water from flowing into inlet 42 of the hot water heater 30. The outlet 65 to the cold water system can include the normal cold water faucets of the building and other outlets for cold water such as water closets. In the preferred embodiment the outlet 65 was coupled to the outdoor water spigots used for example for lawn sprinkling such that during use of significant amounts of cold water, the heat exchanger 24 effectively cools air forced through the fan chamber by the furnace blower while at the same time removing moisture by condensation on the face of the heat exchanger. Suitable water collection means at the base of the furnace are provided for the drainage of water thus collected.

Figure 2:
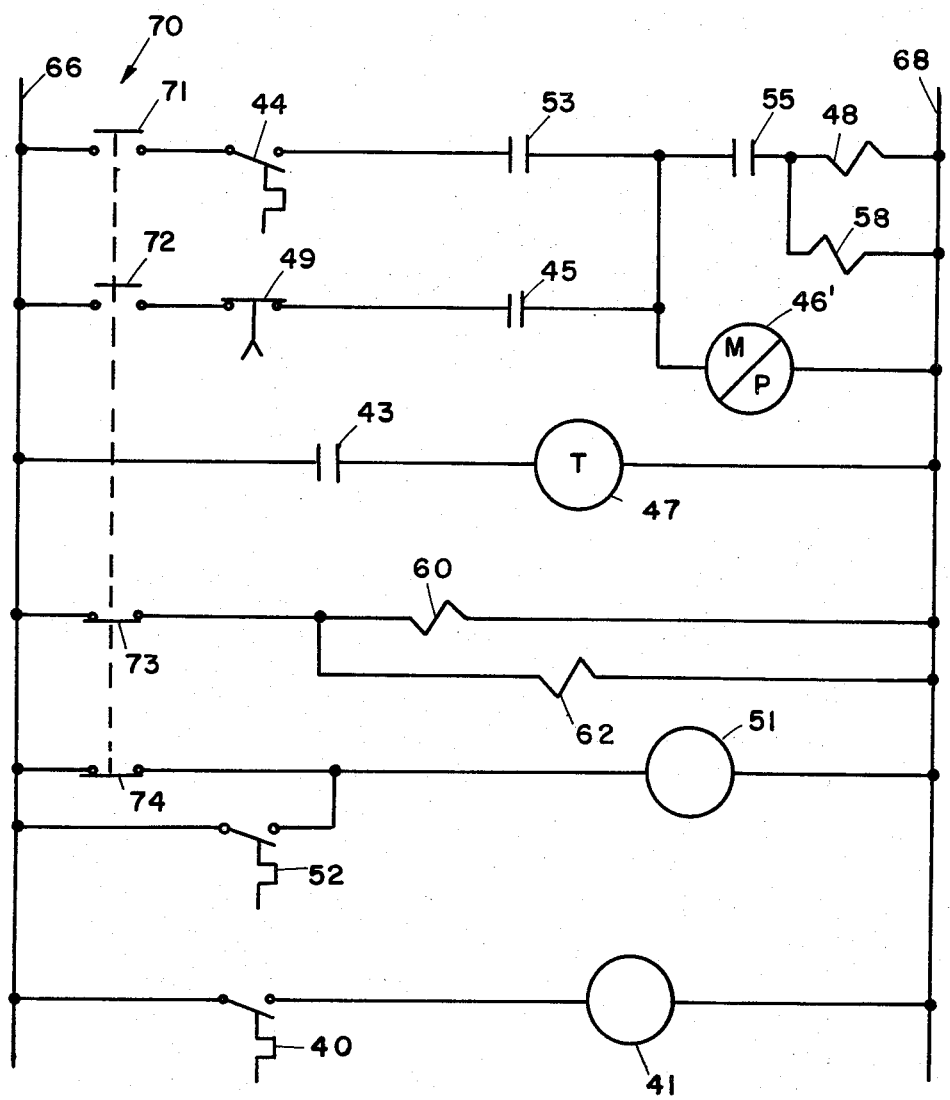
FIG. 2 is an electrical circuit diagram partly in block and schematic form showing the control circuitry for the system shown in FIG. 1.

Having described the flow paths for the liquid in the system, a description of the operation of the various valves to effect automatic operation of the system is now presented in conjunction with FIG. 2.

Power for the electrical control system shown in FIG. 2 is supplied by 115 volt AC bus lines including conductors 66 and 68. It is understood that these conductors are coupled to a master power switch and circuit breaker system as is conventional. The water heater 30 includes a conventional thermostatically controlled switch 40 and associated hot water controller circuit 41 serially coupled to one another with the combination coupled between conductors 66 and 68. Controller 41 in addition to supplying electrical contacts for the actuation of the hot water heater in the usual manner includes an additional set of contacts 43 and 45 for controlling respectively, a timer 47 and a pump motor 46' associated with pump 46. A summer/winter switch 70 is provided and includes four single pole contacts 71 through 74. In the diagram switch 70 is shown in the summer position which effectively electrically disconnects the upper two legs of the electrical circuit diagram. Switch contact 73 actuates the solenoid valves 60 and 62 permitting the cooling water to pass through exchanger 24. Switch contact 74 which is also closed actuates the lower controller 51 for the furnace which thus activates the blower fan in a conventional manner to supply a flow of air across heat exchanger 24. Naturally, with switch 70 set in the summer position furnace 10 will not be operated to provide heat and the water heater 30 will be effectively isolated from the heat exchanger 18. When, however, switch 70 is moved to its wintertime position closing contacts 71 and 72 and opening contacts 73 and 74, the supplemental heating system will be rendered operative.

When thermostat 40 indicates water in tank 30 requires heating, the switch contact associated with thermostat 40 closes thereby supplying power to the controller 41. This in turn closes contacts 43 and 45. Contact 43 when closed actuates a 30-second timer 47 having associated contacts 49 in series with switch 72 and now closed contact 45. Accordingly, for a period of 30 seconds motor 46' is actuated by the closure of switch 49. If the furnace has been operating such that the water in the flue heat exchanger 18 is heated, hot water flows in the first loop through normally open solenoid valve 48.

If the furnace blower is operating due to the closed heat exchanger thermally operative switch 52, blower controller 51 is actuated to close contacts 53 and 55. This in turn applies power to solenoid valves 48 and 58. Valve 48 which is normally open will close while valve 58 which is normally closed opens, thereby permitting the hot water from heat exchanger 18 to flow in the second closed loop path indicated by the dotted lines in FIG. 1. This heated water flows through heat exchanger 24 assisting the furnace operation. With the blower motor on and contacts 53 closed, motor 46' is actuated to circulate water through heat exchanger 24. Once the blower motor turns off, contacts 53 and 55 open, thereby deactivating motor 46' preventing the continued forced circulation of water through heat exchangers 18 and 24. Residual heat in the flue, however, continues to heat water in exchanger 18 which is available for the next cycle of operation of the hot water heater. Valve 56 permits some hot water to bypass pump 46 when turned off, preventing excessive pressure buildup in the system.

The system is furnace selective providing additional heat to the furnace when it is in normal operation due to the closure of the blower contacts 53 and 55 and provides supplementary heat to the water heater on demand when the furnace blower is inoperative and hot water remains in the flue heat exchanger 18.

Thus, the system disclosed provides supplemental heat for both the furnace and the hot water heater of a building during the months when the furnace is in operation and during the summer months can provide supplemental cooling and dehumidification.

It will become apparent to those skilled in the art that various modifications to the preferred embodiment of the invention as described and disclosed herein can be made. Thus, for example, only the first circulation loop with the selectively actuated pump could be provided. Alternately the first and second circulation loops could be employed. If desired, the cooling feature could be combined with either of the above systems. Such modifications will, however, fall within the spirit and scope of the present invention as defined by the appended claims.

The embodiments of the invention in which an exclusive property or privilege is claimed are defined as follows:

1. Heat transfer apparatus comprising:
   a flue heat exchanger adapted to be positioned in a chimney flue;
   conduit means for coupling said heat exchanger to a hot water heater;
   thermally responsive switch means associated with the hot water heater;
   pump means coupled to said heat exchanger and to said conduit means for forcing fluid from said heat exchanger into the hot water heater; and
   timing circuit means coupled to said switch means and to said pump means for activating said pump for a predetermined period of time sufficient to transfer heated water from said heat exchanger to the water heater.

2. The apparatus as defined in claim 1 and further including a second heat exchanger for positioning in the flow path of air in a forced air heating system, additional conduit means coupling said second heat exchanger to said flue heat exchanger, electrically actuated valve means coupled in said conduit means and in said additional conduit means said valve means controlled by the blower controller of the heating system to permit water heated in said flue heat exchanger to heat said second heat exchanger for transferring heat from the flue to the air in the forced air system.

3. Heat transfer apparatus comprising:
a first heat exchanger for positioning in the flue of a furnace;
a second heat exchanger for positioning in the fan chamber of the furnace;
first means for coupling said first heat exchanger in a first fluid circulation loop with a water heater;
second means for coupling said first and second heat exchangers together in a second fluid circulation loop;
valve means for selectively permitting fluid flow in said first or second loops during a heating mode of operation; and
third means for selectively coupling said second heat exchanger to a source of cold water for providing cooling to air flowing through the fan chamber during a cooling mode of operation.

4. The apparatus as defined in claim 3 wherein said first and second circulation loops commonly include a pump for circulating water therein.

5. The apparatus as defined in claim 4 wherein said first, second and third coupling means each include conduit means and at least one electrically actuated valve in series with said conduit means, and wherein said apparatus further includes a control circuit for actuating said valves.

6. The apparatus as defined in claim 5 wherein said control circuit includes a first thermally responsive switch and timer means activated thereby for actuating said pump for a predetermined time in response to the actuation of said thermally responsive switch.

7. The apparatus as defined in claim 6 wherein said first thermally responsive switch is associated with the hot water heater and closes to actuate said pump when water in the heater falls below a predetermined temperature.

8. The apparatus as defined in claim 7 wherein said control circuit includes a summer/winter switch which when in the summer position prevents opening actuation of said electrically actuated valves in said first and second coupling means and actuates said electrically actuated valve means in said third coupling means for permitting cooling fluid to flow through said second heat exchanger; and when said summer/winter switch is in the winter position said electrically actuated valve means in said third coupling means are deactivated and said electrically actuated valve means in said first and second coupling means are permitted to be actuated.

9. The apparatus as defined in claim 8 wherein said control circuit includes a second thermally actuated switch associated with a furnace blower controller for its actuation, said blower controller including switch contacts for actuating said electrically actuated valve means in said first and second loops when said summer/winter switch is in said winter position.

10. Heat transfer apparatus for use in a forced air heating/cooling system comprising:
a first heat exchanger for positioning in the flue of the heating/cooling system;
a second heat exchanger for positioning in the fan chamber of the heating/cooling system;
conduit means coupling said first and second heat exchangers in a circulatory loop;
selectively actuated pump means for circulating fluid in said loop when the heating/cooling system is in a heating mode of operation thereby transferring heat from the flue into the air flow path in the fan chamber;
a source of cooling fluid; and
valve means for selectively blocking said loop and coupling said second heat exchanger to said source when the heating/cooling system is in a cooling mode of operation.

11. The apparatus as defined in claim 10 and further including additional conduit means for selectively coupling said first heat exchanger to a hot water heater for adding heated water from said first heat exchanger to the hot water heater.

* * * * *